United States Patent [19]

Cargould

[11] Patent Number: 4,576,040
[45] Date of Patent: Mar. 18, 1986

[54] DEVICE FOR MEASURING EXTRANEOUS LOSSES IN APPARATUS FOR MEASURING THE ROLLING RESISTANCE OF TIRES

[75] Inventor: Barry D. Cargould, Akron, Ohio

[73] Assignee: Eagle-Picher Industries, Inc., Cincinnati, Ohio

[21] Appl. No.: 508,939

[22] Filed: Jun. 29, 1983

[51] Int. Cl.$^4$ .......................................... G01M 17/02
[52] U.S. Cl. ..................................................... 73/146
[58] Field of Search ........... 73/146, 9, 862.04, 862.36, 73/862.32

[56] References Cited

U.S. PATENT DOCUMENTS 3,867,838  2/1975  Gerresheim ........................... 73/146
4,197,736  4/1980  Barrett ................................... 73/146
4,458,527  7/1984  McFarland ............................ 73/146

Primary Examiner—Donald O. Woodiel
Attorney, Agent, or Firm—Wood, Herron & Evans

[57] ABSTRACT

Apparatus for measuring the rolling resistance of tires. A load cell is mounted on a base and a support is slidably mounted on the base adjacent the road wheel. A tire is mounted on a spindle which is in turn rotatably mounted on bearings to the support. A mechanism is provided for urging the tire against the road wheel. The bearings consist of an inner bearing housing supported by a hydrostatic bearing in an outer housing. A load cell is connected between an inner bearing housing and the support to block rotation of the inner bearing housing and to measure the extraneous losses due to bearing resistance and the like.

3 Claims, 3 Drawing Figures

DEVICE FOR MEASURING EXTRANEOUS LOSSES IN APPARATUS FOR MEASURING THE ROLLING RESISTANCE OF TIRES

This invention relates to apparatus for measuring the rolling resistance of tires, and more particularly, the invention relates to a device for improving the accuracy of the measurement of the rolling resistance.

In general, the apparatus for measuring the rolling resistance of a tire consists of a rotatable road wheel (although it could be a flat belt as shown in U.S. Pat. No. 4,458,527) and a mechanism for pressing a tire against the road wheel at a loading which would be typical for a tire mounted on a vehicle. The road wheel is rotated at a desired speed or speeds to simulate a tire rolling over a highway. A mechanism is provided to measure the force required to rotate the wheel. The tire may, for example, be mounted on a floating frame and a load cell located adjacent the interface between the tire and the road wheel resists the movement of the support and provides a measure of the force tending to move the support.

Such a device, as described, provides an approximation of the rolling resistance of the tire, but that measurement would include extraneous losses due to the tire spindle bearings, rotating air unions for slip rings for tire instrumentation.

A common method used to correct for the extraneous losses has been to load the tire to a lighter load, for example 10% of test load or less, and use the rolling resistance measurement at the light load to correct the measurement made at the test load. This too provides only an approximation since extraneous losses are to some extent a function of the actual test load.

An objective of the present invention is to provide a mechanism for directly measuring the extraneous losses so that they can be subtracted either electronically or arithmetically from the measured rolling resistance under a test load, thereby providing a more accurate measurement of the actual rolling resistance of the tires.

The objective of the invention is attained by providing a hydrostatic bearing and a load cell located between the tire spindle and the platform on which it is supported. More specifically, an outer bearing housing is fixed to the platform which carries the tire. An inner bearing housing is mounted by means of a hydrostatic bearing to the outer bearing housing. The spindle which carries the tire is mounted by conventional bearings to the inner bearing housing. The load cell is connected between the inner bearing housing and the platform to block rotation of the inner bearing housing with respect to the outer bearing housing and thus to provide a measurement of the drag forces (extraneous losses) created by the bearings, air union and slip rings for measurement instrumentation. Stated another way, a torque tending to rotate the inner bearing housing is created by the drag forces as the spindle rotates and the load cell measures that torque which can thereafter be subtracted from the actual rolling resistance measurement which is a combination of the tire rolling resistance and the torque.

The several objectives and features of the invention will become more readily apparent from the following detailed description taken in conjunction with the accompanying drawings in which.

Figure 1:
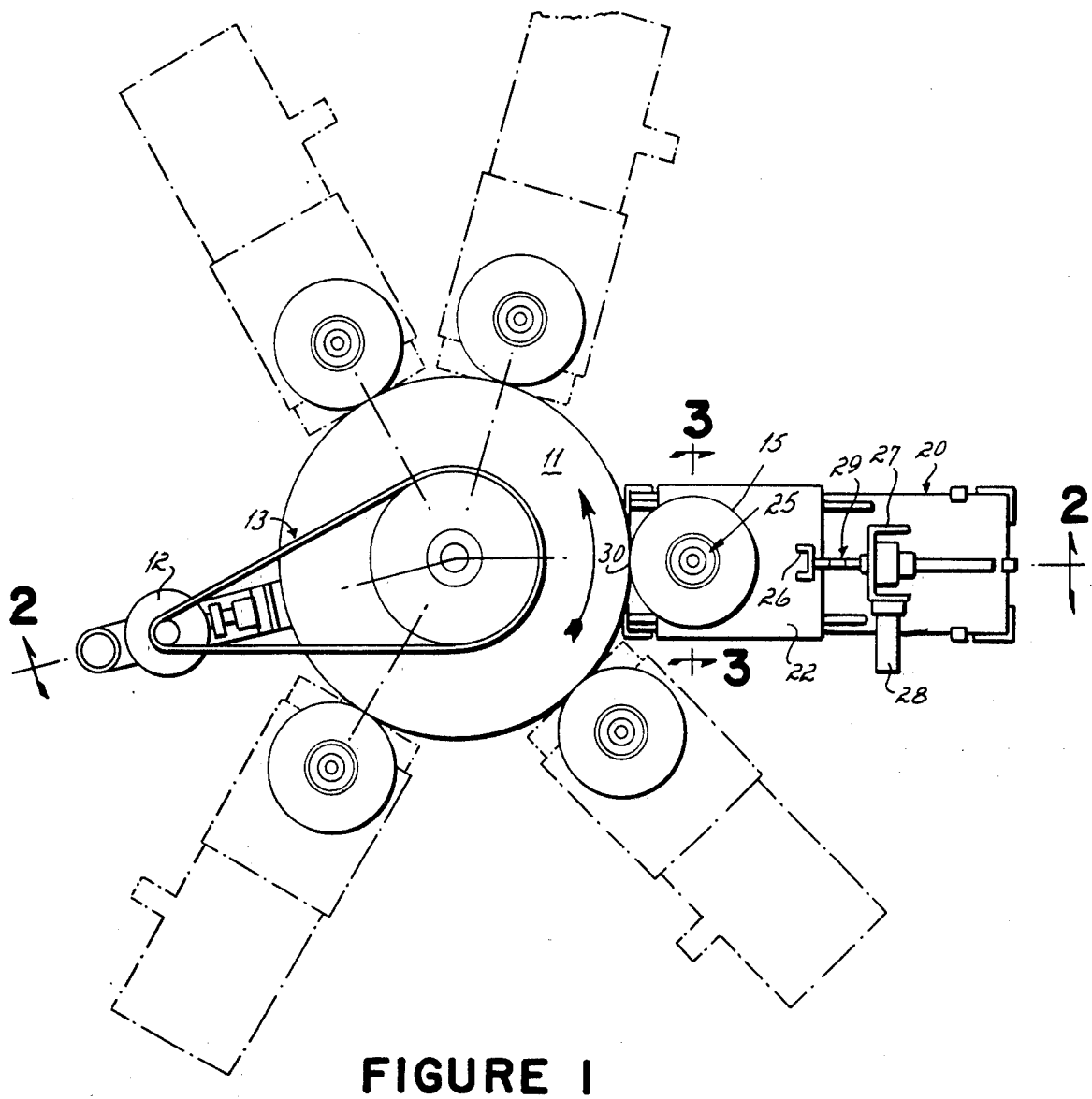
FIG. 1 is a plan view of apparatus for measuring the rolling resistance of tires.

The apparatus for measuring rolling resistance is more fully described in copending application of James C. Beebe and Barry Cargould entitled "Tire Rolling Resistance Measuring System," Ser. No. 492,644 filed in May, 1983.

The apparatus includes a base 10 on which a road wheel 11 is rotatably mounted. The road wheel is driven by a motor 12 through a belt and pulley system 13. A tire 15 is rotatably mounted adjacent the road wheel and pressed against it to simulate a tire rolling over a highway. The tire is mounted to the base as follows: a platform 20 is slidably mounted to the base by oil bearing 21. Within limits the platform can slide, substantially frictionlessly, in any horizontal direction. A carriage 22 is slidably mounted on the platform. A spindle 25 is rotatably mounted on the carriage and supports the tire 15. The carriage has a vertically-projecting bracket 26. A frame 27 is mounted on the platform 20 and carries a motor 28 to drive a ball screw 29 located between the frame and the bracket 26. Rotation of the ball screw 29 causes the carriage 22 and hence the tire 15 to move toward the road wheel, thus loading the tire against the road wheel to simulate actual running conditions. The reaction to the force of the tire on the road wheel is resisted by a radial linkage 32 connected between the platform 20 and the base 10. The radial linkage includes a load cell 33 by which the force of the tire on the road wheel is measured.

Immediately below the interface between the tire and road wheel, indicated at 30, is a load cell 31 which is connected between the floating platform 20 and the base. As the road wheel 11 is driven, the rolling resistance force will tend to move the tire and hence the floating platform 20 in a lateral direction. That movement is resisted by the load cell, and the force applied to it is approximately the rolling resistance of the tire. The force measured by the load cell also includes the drag forces within the bearing system which supports the spindle. Those drag forces are measured by the apparatus of the present invention which can be best comprehended by reference to FIG. 3.

Figure 3:
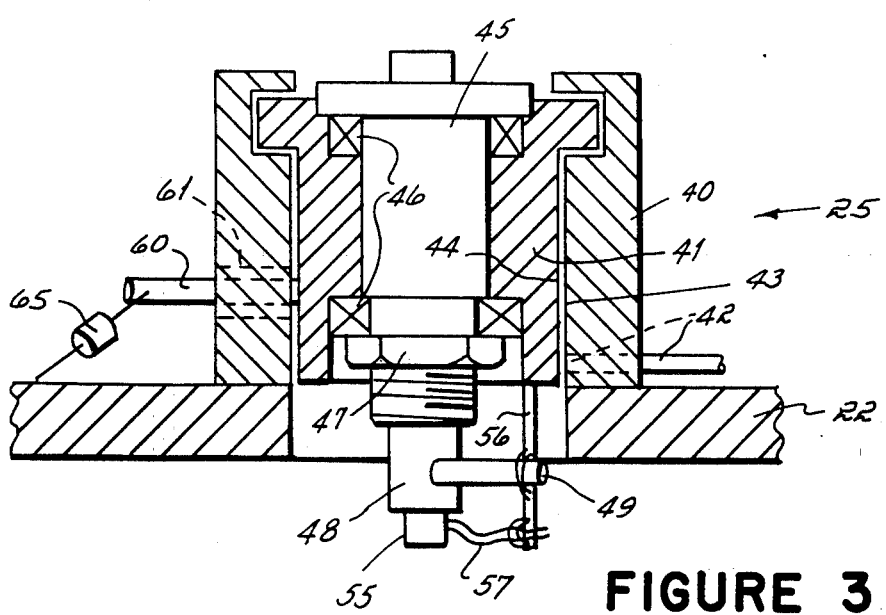
FIG. 3 is a cross-sectional view taken along lines 3—3 of FIG. 1.
Figure 2:
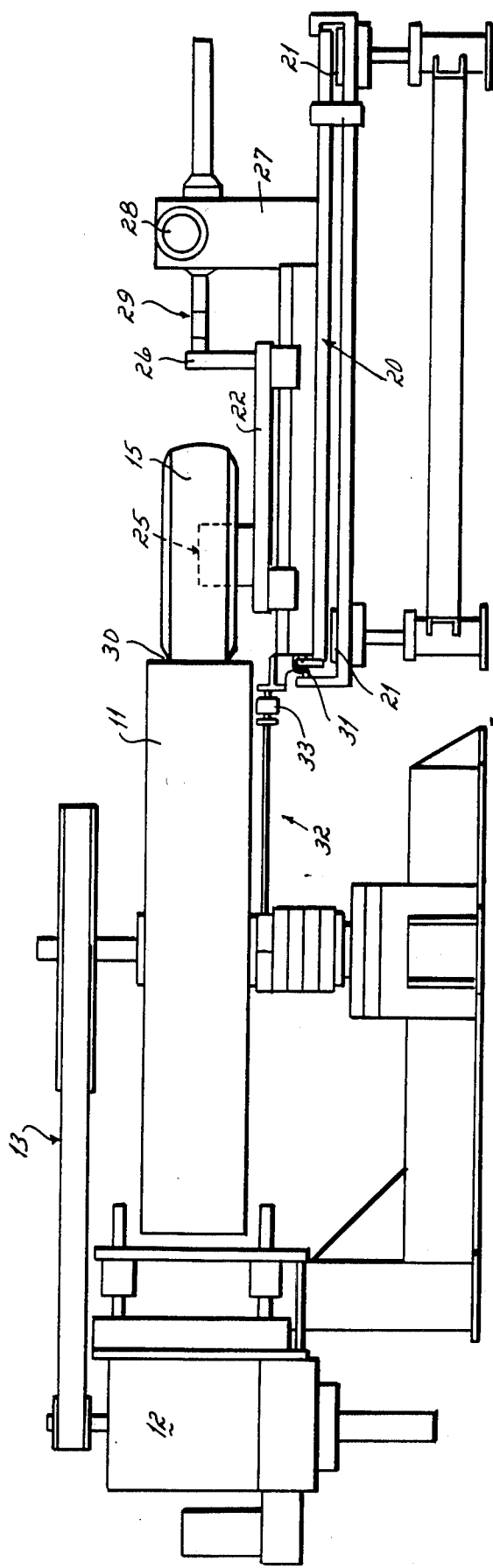
FIG. 2 is a side elevation view of that apparatus as seen in the direction of lines 2—2 of FIG. 1.

As shown in FIG. 3, an outer bearing housing 40 of the spindle 25 is mounted on the carriage 22. An inner bearing housing 41 is rotatably mounted in the outer bearing housing by means of a hydrostatic bearing created by supplying oil through a port 42 between the surfaces 43 and 44 of the outer and inner bearings, respectively. A hollow spindle shaft 45 is mounted by conventional roller or ball bearings 46 to the inner bearing housing, the assembly being secured by a bearing nut 47. A rotating air union 48 is coupled to the spindle to supply air to the spindle through a port 49. The air is supplied to the spindle to inflate the tire and maintain it inflated at the desired pressure. A slip ring assembly 55 is mounted on the spindle and projects through the rotating air union. The slip ring assembly can be connected to a variety of transducers associated with the tire to measure parameters such as temperature and pressure. A post 56 depends from the inner bearing housing, and the port 49 as well as the instrumentation wires 57 for the slip ring assembly are strapped to the post. The connections to the air port 49 and the instrumentation wires 57 should be loose so as not to introduce any significant force tending to restrain rotation of the inner bearing housing.

An arm 60 is fixed to the inner bearing housing and projects through a bore 61 of substantially greater dimension than that of the arm 60 so that the inner bearing housing is free to rotate slightly with respect to the outer bearing housing. A load cell 65 is connected between the arm 60 and the floating platform 20 to resist the tendency of the inner bearing housing to rotate and to measure the forces tending to rotate it, those forces being the extraneous losses arising from the bearings, the rotating union and the slip ring assembly.

In the operation of the invention the tire is inflated to the desired pressure, preferably that which would occur under normal road conditions when the tire has been heated due to its rolling resistance. The tire is pressed against the rotating road wheel 11. The rotating road wheel tends to drive the tire and its floating platform 20 laterally. That force is resisted by the load cell 31, and the force which the load cell measures is the combination of the tire rolling resistance and the drag forces associated with the spindle.

As the tire rotates in the bearings 46, the bearings, the rotating air union 48 and the slip ring assembly 55 tend to resist the rotation imparting drag forces to the spindle. Those drag forces are also imparted to the inner bearing housing 41 which would be permitted to rotate because of the hydrostatic bearing between it and the outer bearing housing. That tendency to rotate is resisted by the load cell 65 which provides the measurement of those drag forces.

Subtracting those drag forces from the measurement provided by the load cell 31 produces the substantially accurate measurement of the rolling resistance of the tire being tested.

Having described my invention, I claim:

1. In apparatus for measuring the rolling resistance of tires, having a mechanism for mounting a tire against a moving surface and means for measuring the tire's rolling resistance, a spindle drag measuring mechanism comprising, a spindle on which said tire is mounted, an inner bearing housing in which said spindle is rotatably mounted, an outer bearing housing in which said inner housing is mounted for limited rotation, said outer housing being fixedly mounted, and a load cell restraining rotary movement of said inner housing with respect to said outer housing, said load cell determining the drag forces associated with the rotating spindle and caused by bearings and the like.

2. Apparatus as in claim 1 further comprising a bore in said outer housing, an arm fixed to said inner housing, said load cell being connected between said arm and a fixed point.

3. Apparatus for measuring the rolling resistance of tires comprising, a base, a road wheel mounted on said base for rotation about a vertical axis, means for rotating the road wheel, means associated with said road wheel for measuring the rolling resistance of a tire engaging it, a support slidably mounted on said base adjacent said road wheel, means for urging said support toward said road wheel, an outer bearing housing mounted on said support, an inner bearing housing rotatably mounted in said outer bearing housing, a tire receiving spindle rotatably mounted in said inner bearing housing, and a load cell connected between said inner bearing housing and said slidable support to block movement of said inner bearing housing and to measure extraneous losses due to bearing resistance and the like, whereby said extraneous losses can be subtracted from the measurement of rolling resistance.

* * * * *